United States Patent [19]
Kozuka et al.

[11] Patent Number: 5,740,162
[45] Date of Patent: Apr. 14, 1998

[54] ISDN TERMINAL ADAPTER

[75] Inventors: Naoki Kozuka, Tokyo; Shigeru Natsume, Shizuoka, both of Japan

[73] Assignee: NEC Corporation, Tokyo, Japan

[21] Appl. No.: 654,673

[22] Filed: May 29, 1996

[30] Foreign Application Priority Data

May 29, 1995 [JP] Japan .................................. 7-130145

[51] Int. Cl.⁶ .................................................. H04Q 3/00
[52] U.S. Cl. ........................ 370/264; 370/382; 370/463
[58] Field of Search ............................. 370/431, 432, 370/435, 437, 463, 466, 467, 475, 536, 542, 543, 544, 904, 402, 401, 259, 263, 264, 382, 383; 379/219, 220, 229

[56] References Cited

U.S. PATENT DOCUMENTS 5,329,572  7/1994  Martens ...................... 348/16
5,504,743  4/1996  Drefenstedt .................... 370/395
5,524,111  6/1996  Le Pennec et al. .............. 370/465
5,542,630  8/1996  Gagliardi et al. ............... 370/402
5,610,976  3/1997  Uota et al. ..................... 379/127

*Primary Examiner*—Alpus H. Hsu
*Assistant Examiner*—Kwang Bin Yao
*Attorney, Agent, or Firm*—Sughrue, Mion, Zinn, Macpeak & Seas, PLLC

[57] ABSTRACT

A memory has stored therein ISDN addresses of destination stations, as they constitute sets with heading addresses thereof different from each other, and is retrieved from a controller to detect a match between an ISDN address in a call request and a heading address of a corresponding set, and a total number of ISDN addresses are read from the corresponding set for controlling channel connection processors and S/T point interfaces to have a corresponding number of channels connected to a corresponding destination station in accordance with a necessary number of channels for a bulk transmission.

4 Claims, 1 Drawing Sheet

ISDN TERMINAL ADAPTER

BACKGROUND OF THE INVENTION

The present invention generally relates to an integrated services digital network (hereafter "ISDN") terminal adapter, and particularly, to an ISDN terminal adapter of a type implemented to be provided between data terminal equipment (hereafter "DTE") operable for reception and transmission of data and a network adapted for exchanging ISDN channels, to respond to a designation command on an ISDN address representative of a destination of channel connection, as it is transmitted from the DTE, to have a plurality of channels of a predetermined data transmission rate connected between the DTE and the destination through the network, for a bulk transmission of communication data from the DTE at a higher rate than the predetermined rate, as the communication data are separated to be transmitted by the plurality of channels.

DESCRIPTION OF THE RELATED ART

A typical conventional ISDN terminal adapter of such the type is implemented to be responsive to a command on an ISDN address representative of a destination of channel connection, as it is transmitted from a DTE, to simply designate the ISDN address of one of a necessary number of channels to be connected for transmitting communication data from the DTE, needing a channel connection to be likewise repeated in response to an address designating command from the DTE until the necessary number of channels are all connected.

The conventional ISDN terminal adapter thus permits an ISDN address to be designated for a single one of a necessary number of channels to be connected for a bulk transmission, and needs a transmission of an address designating command to be repeated, as required, in accordance with a transmission rate of communication data corresponding to the necessary number of channels, taking a relatively long period of time for a total connection, with an increased possibility of conducting an erroneous operation.

The present invention has been achieved with such points in mind.

SUMMARY OF THE INVENTION

It therefore is an object of the present invention to provide an ISDN terminal adapter implemented to be responsive to a transmitted command with an ISDN address designated for an arbitrary single channel of a destination to be connected, to permit a connection to the same destination for a different transmission rate, i.e. by a different number of channels.

To achieve the object, a genus of the invention provides an ISDN terminal adapter connected between terminal equipment operative for a data transmission and an ISDN channel exchange network for conducting a channel exchange, the ISDN terminal adapter being responsive to a variable number of a plurality of ISDN addresses each respectively representative of one of a corresponding number of a plurality of channels to be connected at a corresponding one of a plurality of destinations, as the variable number of ISDN addresses are informed from the terminal equipment, to have a corresponding number of communication channels established with a predetermined data transmission rate through the ISDN channel exchange network to the corresponding destination for a bulk transmission for transmitting communication data of the terminal equipment higher in data transmission rate than the predetermined data transmission rate, by portioning out the communication data among the plurality of communication channels, wherein the ISDN terminal adapter includes a memory means for storing a first set of the plurality of ISDN addresses, the first set consisting of a plurality of second sets of ISDN addresses, the plurality of second sets each respectively corresponding to one of the plurality of destinations and each respectively consisting of a plurality of third sets of ISDN addresses, the plurality of third sets each respectively corresponding to one number within a variable range of the variable number of ISDN addresses and containing a corresponding number of ISDN addresses to said one number, the corresponding number of ISDN addresses including a representative one thereof so that the respective representative addresses of the plurality of third sets are different from each other, and a control means responsive to a corresponding ISDN address to one of the plurality channels, as it is received by the control means from the terminal equipment requesting a call transmission, to retrieve the memory means for detecting a match between the corresponding ISDN and one of the representative addresses of the plurality of third sets and for responding to the match, as it is detected, to read the corresponding number of ISDN addresses of a corresponding one of the plurality of third sets, the control means being responsive to the corresponding number of read ISDN addresses to make a connection request to the ISDN channel exchange network for connecting a number of the plurality of communication channels equivalent in number to the corresponding number of read ISDN addresses to the corresponding destination.

According to the genus of the invention, in an ISDN terminal adapter, a memory means has stored therein for each destination station a number of sets of ISDN addresses corresponding to a necessary number of channels of a predetermined data transmission rate for a bulk transmission at a higher rate than the predetermined rate, as a representative address of each set is different from that of the rest, and a control means is responsive to an ISDN address in a call request from terminal equipment to detect a match thereof with a representative address, read a total number of ISDN addresses of a corresponding set, and make a connection request to an ISDN channel exchange network for a connection of corresponding communication channels, thus permitting a selective designation of ISDN address by the terminal equipment to effect a bulk transmission at a different transmission rate than the predetermined rate.

According to a species of the genus of the invention, the ISDN terminal adapter further comprises a terminal equipment interface means for electrically level-converting transmission data from the terminal equipment and reception data to the terminal equipment, a plurality of S/T point interface means for a mutual conversion between a format of one of the communication data of the terminal equipment corresponding to one of the communication channel of the ISDN channel exchange network and a data frame format of the ISDN channel exchange network, a plurality of channel connection processor means responsive to the respective ISDN addresses for controlling the connection of the communication channels of the ISDN channel exchange network through the plurality of S/T point interface means, and a bulk transmission means for portioning out high-speed communication data of the terminal equipment interface means among the plurality of channel connection processor means in terms of the predetermined data transmission rate.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
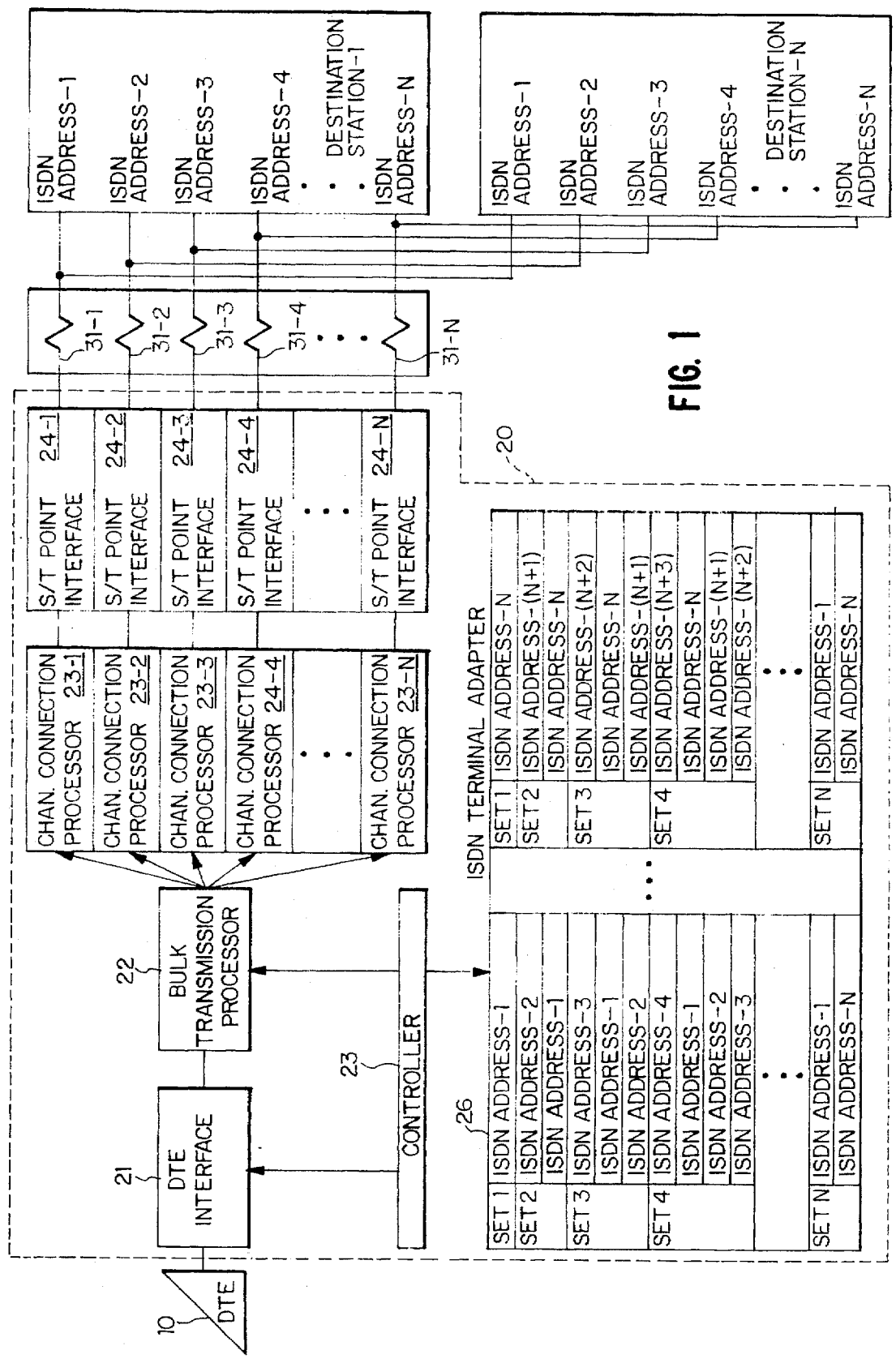
FIG. 1 is a block diagram of an ISDN system including an ISDN terminal adapter according to an embodiment of the invention.

There will be detailed below the preferred embodiments of the present invention, with reference to FIG. 1.

FIG. 1 shows an embodiment of the invention.

In FIG. 1, designated at reference character 10 is a concerned DTE, 20 is an ISDN terminal adapter for the DTE 10, and 30 is an ISDN channel exchange network.

The terminal adapter 20 comprises: a DTE interface 21 operable for an electrical level conversion of transmission data from the DTE 10; a bulk transmission processor 22 for portioning out a set of high-speed transmission data from the DTE interface 21 among a necessary number v of a total of I associated B channels 31 of the ISDN channel exchange network 30, where I is a predetermined positive integer, e.g. 4, and v is a variable integer such that 1≦v≦I; a total of I channel connection processors 23 of which an i-th one 23-i controls a connection of an i-th B channel 31-i of the ISDN channel exchange network 30, where i is an arbitrary positive integer such that 1≦i≦I; a total of I S/T point interfaces 24 of which an i-th one 24-i is connected to the i-th channel connection processor 23-i for reformatting a corresponding I/O data of the bulk transmission processor 22 in accordance with a data frame format of the ISDN channel exchange network 30; a memory 26 consisting of a total of N blocks of which an n-th one has registered therein an n-th total set of ISDN addresses of a total of v channels associated with an n-th one (station-n) of a total of N destination stations, as the n-th total set includes a total of I ISDN address sets of which an i-th one (set-i) contains a total of i ISDN addresses-(n+v−1), where N is a predetermined positive integer and n is an arbitrary positive integer such that 1≦n≦N; and a controller 25 for the terminal adapter 20.

The address registration to the memory 26 will be described below.

For an arbitrary n-th one (station-n) of the N destination stations, a plurality (=I) of B channels 31 are connectable. For an arbitrary i-th one 31-i of the B channels 31, a dedicated ISDN address-(n+i) is assigned to be different from any other address. For a bulk transmission between the ISDN terminal adapter 20 and the destination station-n, the necessary number v of B channels 31 to be connected is variable between 1 and I in accordance with an associated data transmission rate, thus needing a corresponding set (set-i) of ISDN addresses to be defined.

The memory 26 has stored in each block thereof a total set of such necessary address sets for a corresponding destination station.

Each such address set-i contains a total of i ISDN addresses-(n+v−1) arranged in an order in which an i-th address-(n+i−1) is located at a heading place and the remaining addresses-(n+v−1: v<i) are located at following places in an increasing order of the variable integer v so that, in a total of N×I address sets stored in the memory 26, an arbitrary address set-i has a heading ISDN address-(n+i−1) different from that of any other address set.

In the embodiment of FIG. 1 where I=4, the memory 26 has stored therein for e.g. a first destination station-1 a total of four ISDN address sets, i.e.: a first set-1 containing a single ISDN address-(1+1−1) for a data transmission rate corresponding to a first B channel 31-1; a second set-2 containing a total of two ISDN addresses-(1+1−1) and -(1+2−1) for a data transmission rate corresponding to a combination of the first 31-1 and a second B channel 31-2; a third set-3 containing a total of three ISDN addresses-(1+1−1), -(1+2−1) and -(1+3−1) for a data transmission rate corresponding to a combination of the first 31-1, the second 31-2 and a third B channel 31-3; and a fourth set-4 containing a total of four ISDN addresses-(1+1−1), -(1+2−1), -(1+3−1) and -(1+4−1) for a data transmission rate corresponding to a combination of the first 31-1, the second 31-2, the third 31-3 and a fourth 8 channel 31-4.

The heading address in the first set-1 is ISDN address-1, in the second set-2 is ISDN address-2, in the third set-3 is ISDN address-3, and in the fourth set-4 is ISDN address-4 so that each set-i is identifiable from its heading address-(1+i−1), permitting the necessary number v of B channels to be determined therefrom.

Likewise, in a total address set for an N-th destination station-N, a first set-1 has a heading ISDN address-(N+1−1), a second set-2 has a heading ISDN address-(N+2−1), a third set-3 has a heading ISDN address-(N+3−1), and a fourth set-4 has a heading ISDN address-(N+4−1).

Actions of the ISDN system of FIG. 1 will be described below.

The DTE 10 outputs to the ISDN terminal adapter 20 a command including a call transmission request using a heading ISDN address-(n+i−1) of an address set-i corresponding to a necessary number of B channels 31 for a requested data transmission at a desirable transmission rate The controller 25 checks for a match between the ISDN address-(n+i−1) in the request from the DTE 10 and a heading address of any address set in the memory 26.

When the match is found, an entirety of a corresponding set of ISDN addresses containing the heading address in concern is referenced by the controller 25, which is responsive thereto to control one or more corresponding channel connection processors 23-i and one or more corresponding S/T point interfaces 24-i so that necessary steps for call transmission are completed of a necessary number of channels for transmitting data from the DTE 10 by a bulk transmission via the necessary number of B channels 31-i to be connected.

For example, for a connection to the destination station-1, the DTE 10 may send a command including the ISDN address-4, In this case, the controller 25 checks that the address-4 in the command matches with the heading address of the fourth set-4 for the station-1 and detects that this set-4 contains a total of four ISDN addresses-1, -2, -3 and -4.

Therefore, the controller 25 sends the four ISDN addresses to a total of four combinations of channel connection processor 23-i and S/T point interface 24-i, respectively, each of which combination responds thereto to execute the necessary steps for channel connection.

In the embodiment of FIG. 1, the channel connection processor 23-i is controlled to be cooperative with the S/T point interface 24-i to make a request to the ISDN channel exchange network 30 for a transmission to the ISDN address-i.

In response thereto, the ISDN channel exchange network 30 connects the B channel 31-i so that the ISDN terminal adapter 20 for the DTE 10 is connected via the B channel 31-i to the destination station-1, for each associated i.

The ISDN address in the command from the DTE 10 is thus selected in accordance with a necessary number of B channels to be connected in correspondence to a desirable data transmission rate, permitting a connection for a bulk transmission at a different transmission rate than a predetermined.

After the connection of the necessary number of B channels 31-i, the system enters a data communication in which a set of high-speed data from the DTE 10 is input to the DTE interface 21, where they are electrically level-converted to be processed in the bulk transmission processor 22 so that processed data are portioned out among the necessary number of connected channels, to be transmitted via one or more channel connection processors 28-i, one or more S/T point interfaces 24-i and one or more B channels 31-i of the ISDN channel exchange network 80 to the destination station in concern.

Accordingly, the high-speed data from the DTE 10 are effectively transmitted through a bundle of B channels 31 of the ISDN channel exchange network 30.

For a disconnection, the DTE 10 sends a command including a disconnection request. In response thereto, the controller 25 controls one or more channel connection processors 23-i and one or more S/T point interfaces 24-i for disconnecting the connected channels, using the ISDN addresses employed for the connection.

It will be understood that the ISDN terminal adapter 20 serves for a data transmission to the DTE 20, as the bulk transmission processor 22 collects and reformats transmitted data from connected communication channels and the DTE interface 21 level-converts them in a reverse direction.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ISDN terminal adapter for providing bulk data communication through channels of an ISDN channel exchange network to a plurality of destination stations having terminal equipment, comprising:

a memory means for storing a first set of addresses identifying each destination station of said plurality of destination stations, each element of said first set consisting of at least one second set of addresses, each address of said second set respectively corresponding to a unique ISDN destination address of said destination station, and each destination address respectively corresponding to one number within a variable range of a variable number of ISDN addresses, such that each set of said second sets corresponds to one or more ISDN addresses and such that each set in said second set of addresses corresponds to a given data transmission rate; and a control means for matching an element of said first set of addresses stored in said memory means with a respective destination station and matching said second set of addresses stored in said memory means to a predetermined transmission rate for bulk data transmission to a destination station through an ISDN channel exchange network.

2. An ISDN terminal adapter according to claim 1, further comprising:

a terminal equipment interface means for preparing input transmission data for bulk transmission along one or more channels of an ISDN channel exchange network;

a plurality of S/T point interface means for conversion between a format of communication data of the terminal equipment corresponding to one of the communication channels of the ISDN channel exchange network and a data frame format of the ISDN channel exchange network;

a plurality of channel connection processor means responsive to the respective ISDN addresses for controlling the connection of the communication channels of the ISDN channel exchange network through the plurality of S/T point interface means; and a bulk transmission means for portioning out high-speed communication data of the terminal equipment interface means among the plurality of channel connection processor means in terms of the predetermined data transmission rate.

3. A method for transmitting data in bulk across an ISDN channel exchange network to one or more destination stations, comprising the steps of:

connecting an ISDN terminal adapter between terminal equipment operative for data transmission, including said one or more destination stations, and said ISDN channel exchange network for conducting a channel exchange;

storing in a memory in said ISDN terminal adapter a first set of output addresses for each destination station, such that said first set of output addresses respectively corresponds to one or more second sets of output addresses for each respective destination station, each of said second sets containing one or more ISDN channel addresses for connection to said destination station such that each set of said second sets of output addresses corresponds to a given data transmission rate;

determining for a given set of transmission data a destination station and a predetermined data transmission rate;

matching said destination station to a first set of output addresses and matching said predetermined transmission rate to a second set of output addresses; and establishing ISDN channel connections based on said first set and second set of addresses.

4. A method for transmitting data in bulk across an ISDN channel exchange network to one or more destination stations as recited in claim 3, comprising the additional step of:

formatting said set of transmission data for ISDN transmission.

* * * * *

UNITED STATES PATENT AND TRADEMARK OFFICE
CERTIFICATE OF CORRECTION

PATENT NO.   : 5,740,162
DATED        : April 14, 1998
INVENTOR(S)  : Kozuka et al It is certified that error(s) appears in the above-identified patent and that said Letters Patent is hereby corrected as shown below:

Column 5, line 16, delete "80" and insert --30--.

Signed and Sealed this

Twenty-fifth Day of August, 1998

Attest:

BRUCE LEHMAN

Attesting Officer    Commissioner of Patents and Trademarks